(12) United States Patent
Vialard et al.

(10) Patent No.: US 12,522,790 B2
(45) Date of Patent: Jan. 13, 2026

(54) DEVICE FOR OBSERVING A LIVING CELL OR A SET OF LIVING CELLS

(71) Applicants: UNIVERSITÉ DE VERSAILLES SAINT-QUENTIN-EN-YVELINES, Versailles (FR); CENTRE HOSPITALIER INTERCOMMUNAL DE POISSY-SAINT-GERMAIN, Saint-Germain-en-Laye (FR); CENTRE HOSPITALIER UNIVERSITAIRE DE BORDEAUX, Talence (FR); CENTRE NATIONAL DE LA RECHERCHE SCIENTIFIQUE, Paris (FR); UNIVERSITÉ DE BORDEAUX, Bordeaux (FR)

(72) Inventors: François Vialard, Paris (FR); Clément Jimenez, Paris (FR); Christophe Geindre, Pessac (FR); Bruno Hiberty, Pessac (FR); Hugo Ducros, Pessac (FR)

(73) Assignees: UNIVERSITÉ DE VERSAILLES SAINT-QUENTIN-EN-YVELINES VERSAILLES (FR), Versailles (FR); CENTRE HOSPITALIER INTERCOMMUNAL DE POISSY-SAINT-GERMAIN, Saint-Germain-en-Laye (FR); UNIVERSITÉ DE BORDEAUX, Bordeaux (FR); CENTRE HOSPITALIER UNIVERSITAIRE DE BORDEAUX, Talence (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 877 days.

(21) Appl. No.: 17/628,164

(22) PCT Filed: Jul. 16, 2020

(86) PCT No.: PCT/FR2020/051277
§ 371 (c)(1),
(2) Date: Jan. 18, 2022

(87) PCT Pub. No.: WO2021/009465
PCT Pub. Date: Jan. 21, 2021

(65) Prior Publication Data
US 2022/0267703 A1     Aug. 25, 2022

(30) Foreign Application Priority Data
Jul. 18, 2019  (FR) ....................... 1908163

(51) Int. Cl.
*G02B 21/06*      (2006.01)
*C12M 1/32*       (2006.01)
(Continued)

(52) U.S. Cl.
CPC ............ *C12M 21/06* (2013.01); *C12M 23/12* (2013.01); *G02B 21/0088* (2013.01);
(Continued)

(58) Field of Classification Search
CPC ....... C12M 21/06; C12M 23/12; G02B 21/00; G02B 21/0004; G02B 21/0012;
(Continued)

(56) References Cited

U.S. PATENT DOCUMENTS

| | | |
|---|---|---|
| 4,852,985 A | 8/1989 | Fujihara et al. |
| 6,238,911 B1 | 5/2001 | Kasahara |
| (Continued) | | |

FOREIGN PATENT DOCUMENTS

| | | |
|---|---|---|
| CN | 109739016 A | 5/2019 |
| WO | 2016145476 A1 | 9/2016 |
| (Continued) | | |

OTHER PUBLICATIONS

Foreign Communication from a Related Counterpart Application, First Office Action dated Oct. 31, 2023, Chinese Application No. 202080051859.9.

(Continued)

*Primary Examiner* — Thong Q Nguyen
(74) *Attorney, Agent, or Firm* — Conley Rose, P.C.

(57) ABSTRACT

An imaging device (100) for observing the development of a living cell or a set of living cells such as embryos (80), comprising a lighting system (110), and an imaging system (120) equipped with a wide-field camera (121) which is adapted to allow the identification, the imaging and the observation of one or more living cells or sets of living cells (80) to be observed. The invention also relates to a method for observing the development of embryos by way of such a device (100).

12 Claims, 12 Drawing Sheets

(51) Int. Cl.
*C12M 3/00* (2006.01)
*G02B 21/00* (2006.01)
*G02B 21/36* (2006.01)
*G02B 26/00* (2006.01)

(52) U.S. Cl.
CPC ........... *G02B 21/06* (2013.01); *G02B 21/361* (2013.01); *G02B 26/005* (2013.01)

(58) Field of Classification Search
CPC ............ G02B 21/0016; G02B 21/0032; G02B 21/0052; G02B 21/006; G02B 21/008; G02B 21/0084; G02B 21/0088; G02B 21/06; G02B 21/08; G02B 21/082; G02B 21/084; G02B 21/086; G02B 21/088; G02B 21/10; G02B 21/12; G02B 21/125; G02B 21/36; G02B 21/361; G02B 21/365; G02B 21/367
USPC .................................................. 359/368–398
See application file for complete search history.

(56) References Cited

U.S. PATENT DOCUMENTS

| | | | | |
|---|---|---|---|---|
| 7,226,185 | B2* | 6/2007 | Dolgin | G02B 3/00 362/455 |
| 2001/0033414 | A1* | 10/2001 | Yahiro | B01L 3/5085 250/201.3 |
| 2006/0001954 | A1* | 1/2006 | Wahl | G02B 21/086 359/368 |
| 2009/0133170 | A1 | 5/2009 | Rolland et al. | |
| 2016/0187359 | A1 | 6/2016 | Loewke et al. | |

FOREIGN PATENT DOCUMENTS

| | | |
|---|---|---|
| WO | 2019141951 A1 | 7/2019 |
| WO | 2021009465 A1 | 1/2021 |

OTHER PUBLICATIONS

Foreign Communication from a Related Counterpart Application, International Search Report dated Oct. 30, 2020, International Application No. PCT/FR2020/051277 filed on Jul. 16, 2020.

Foreign Communication from a Related Counterpart Application, Written Opinion dated Oct. 30, 2020, International Application No. PCT/FR2020/051277 filed on Jul. 16, 2020.

Vitrolife. "Preparation of EmbryoSlide Flex culture dishes" May 1, 2019 (May 1, 2019). Retrieved from the Internet: https://www.vitrolife.com/globalassets/support-documents/tech-notes/technote_embryoscope-flex-dish-preparation_v1.pdf XP055695962.

Ryo Sugimoto et al. "Contrast enhancement by oblique illumination microscopy with an LED array" Optik., DE, vol. 183, Apr. 1, 2019 (Apr. 1, 2019), pp. 92-98 DOI: 10.1016/j.ijleo.2019.02.068 ISSN: 0030-4026, XP055741405.

Alison Campbell, et al.: "Atlas of Time Lapse Embryology" In "Atlas of Time Lapse Embryology", Jan. 21, 2015, CRC Press, XP055695486.

* cited by examiner

[Fig. 1]
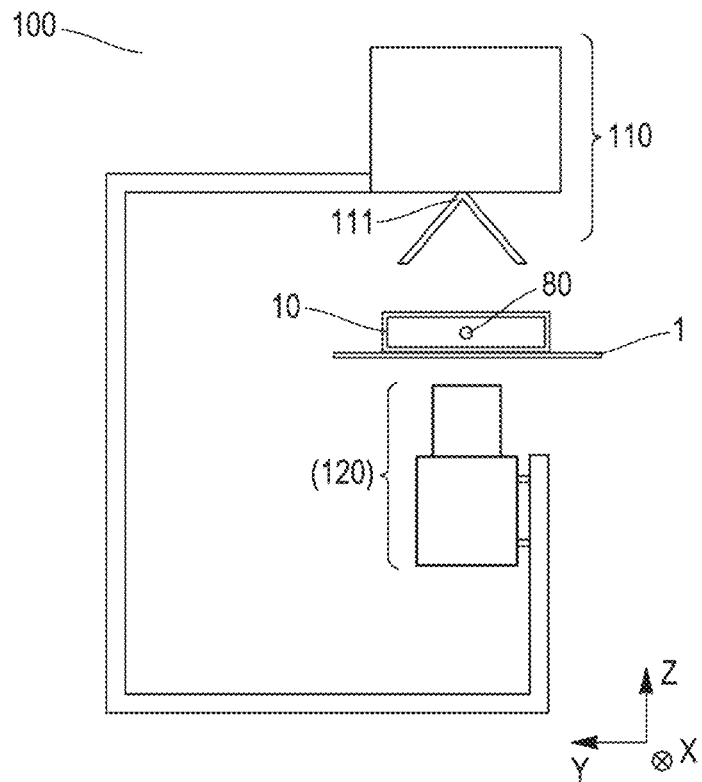
[Fig. 2]
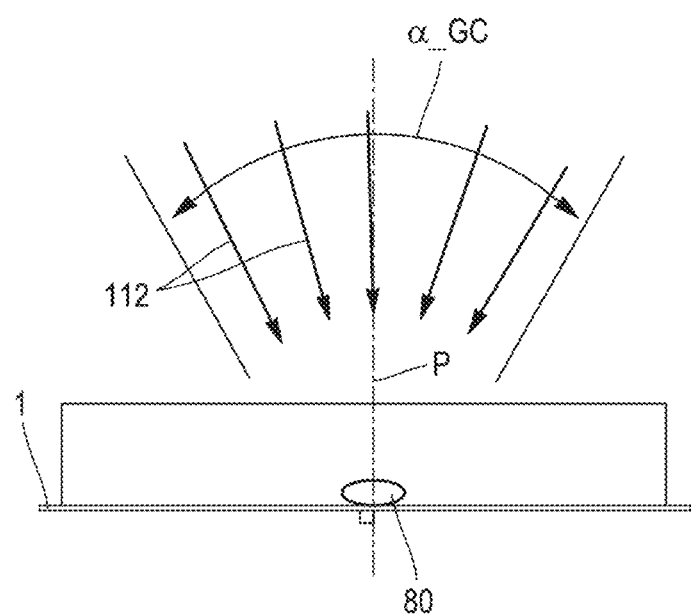

[Fig. 3]
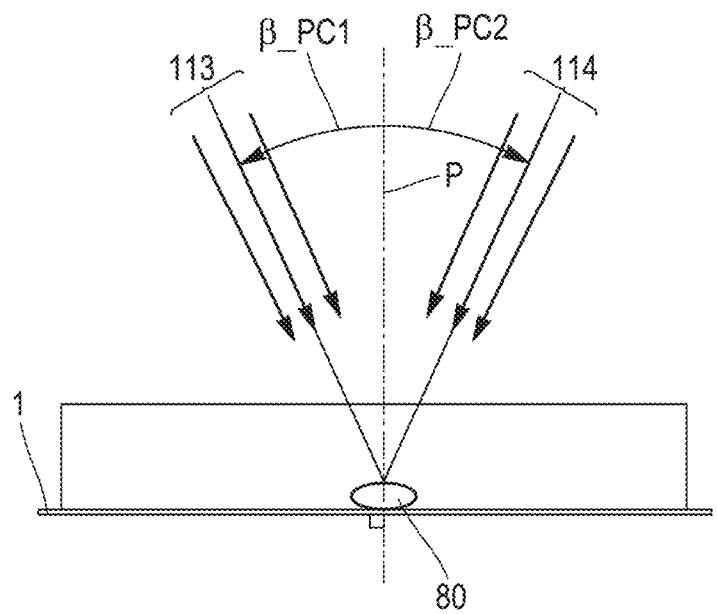
[Fig. 4]
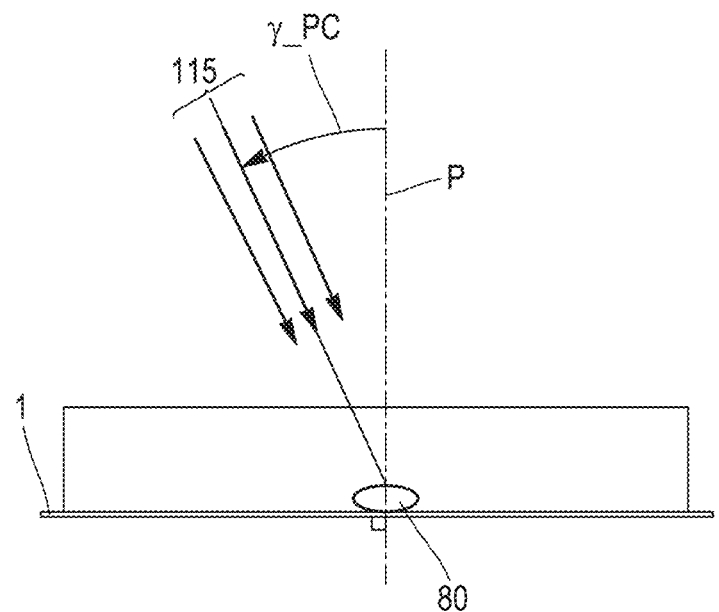

[Fig. 5]
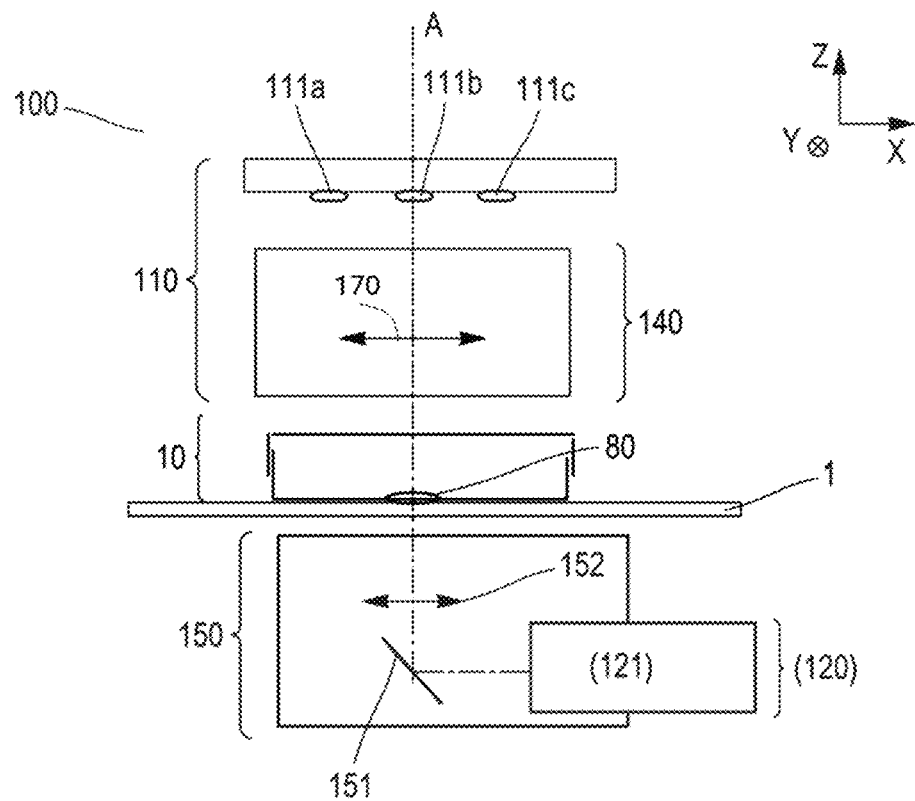
[Fig. 6]
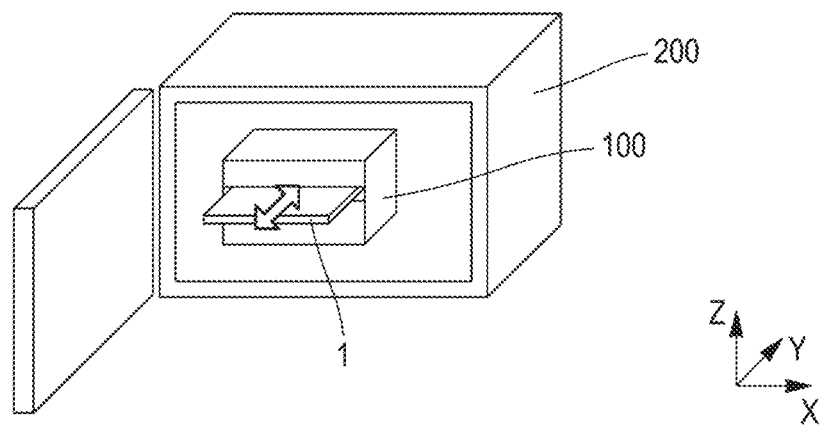

[Fig. 7a]
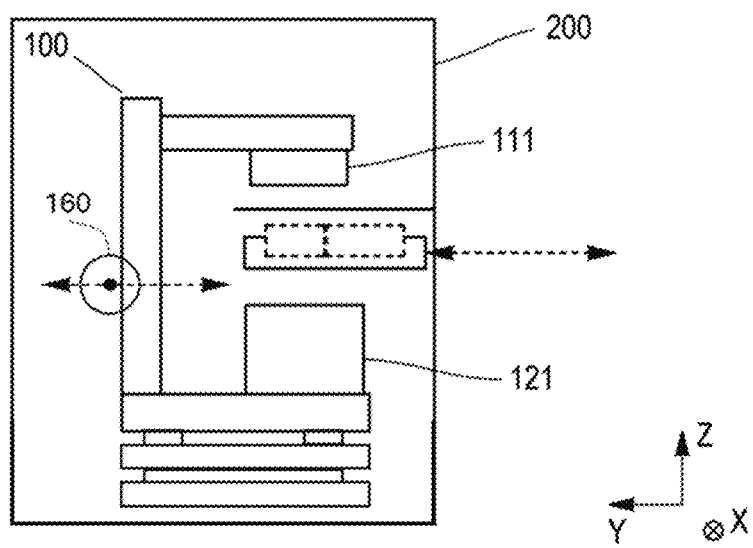
[Fig. 7b]
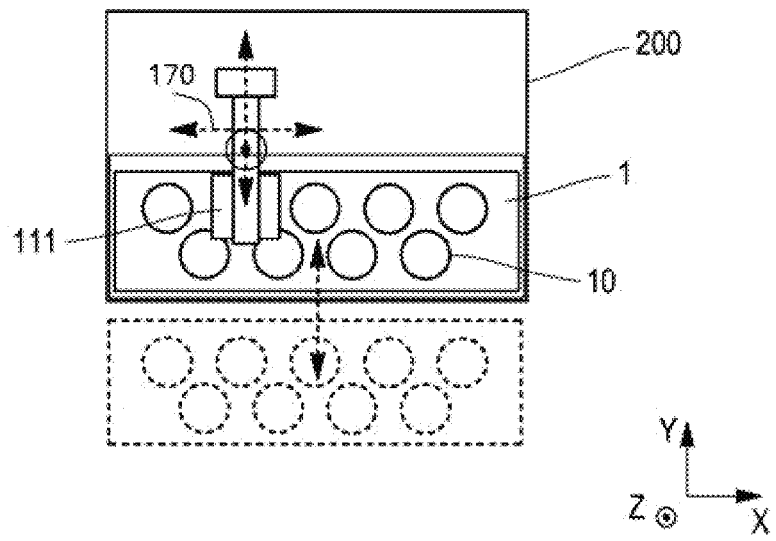

[Fig. 7c]
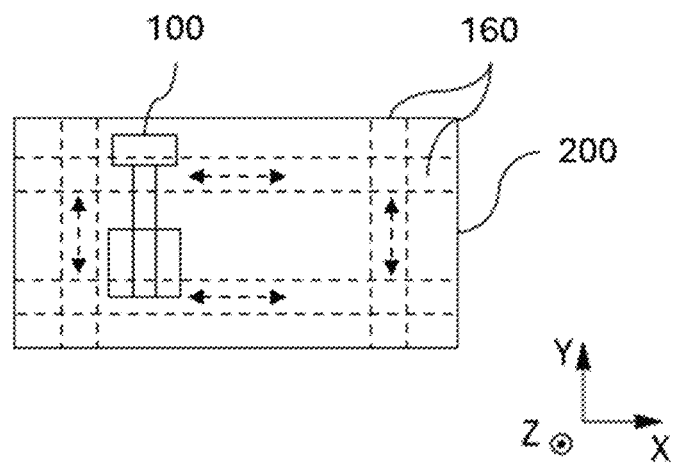
[Fig. 8a]
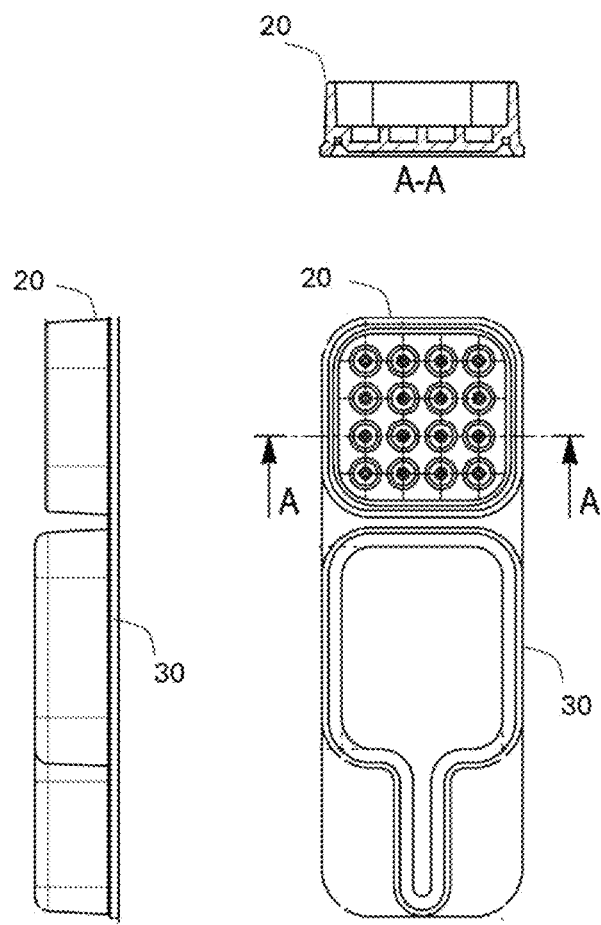

[Fig. 8b]
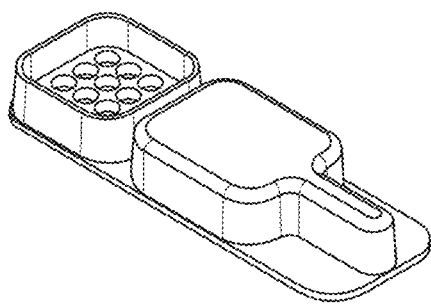
[Fig. 9a]
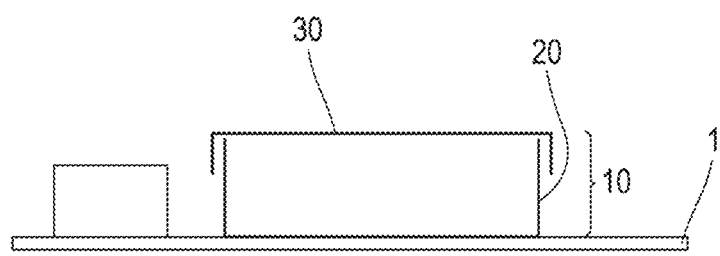

[Fig. 9b]
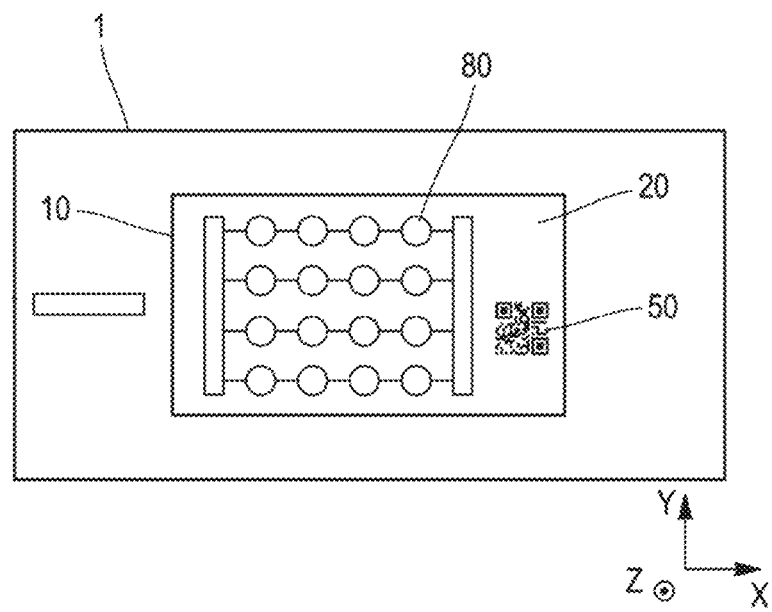
[Fig. 10]
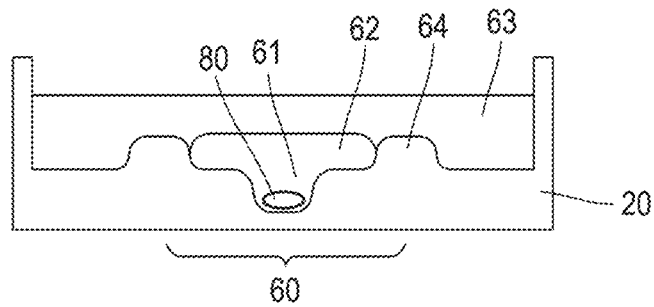
[Fig. 11a]
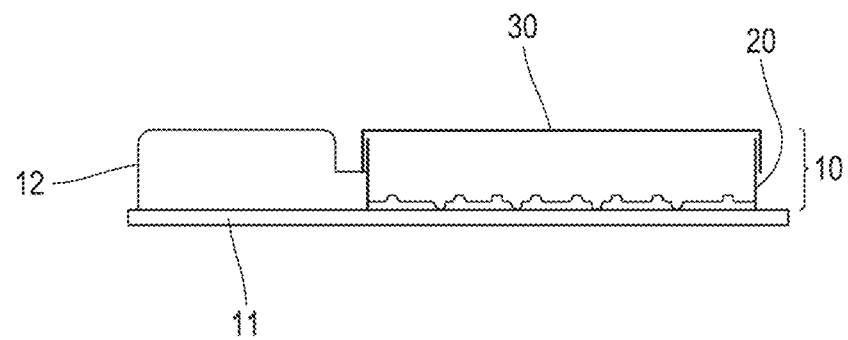

[Fig. 11b]
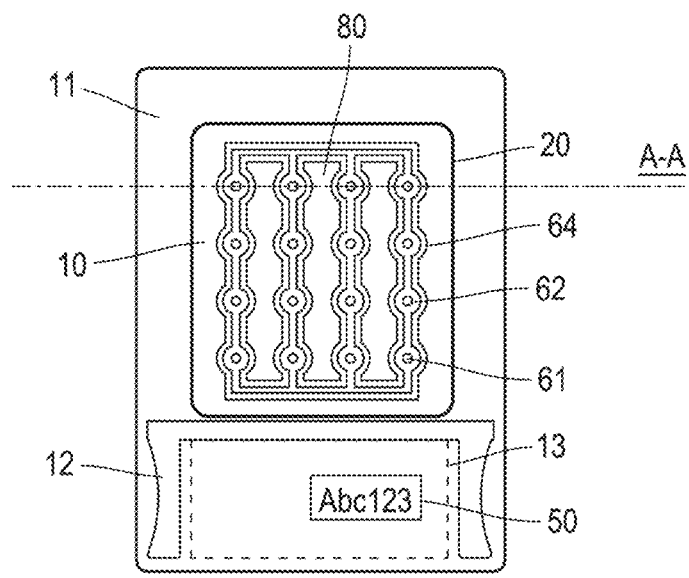
[Fig. 11c]
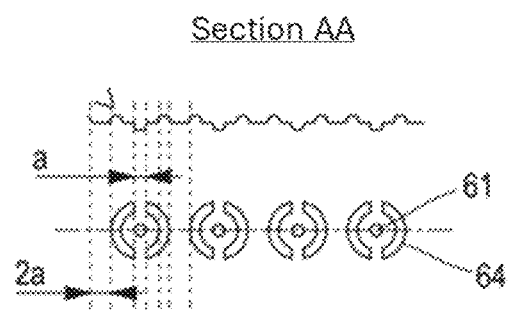

[Fig. 12]
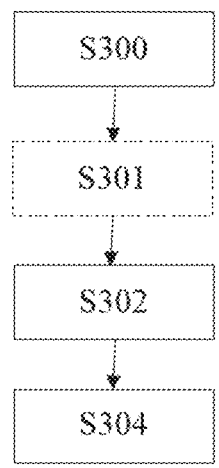
[Fig. 13]
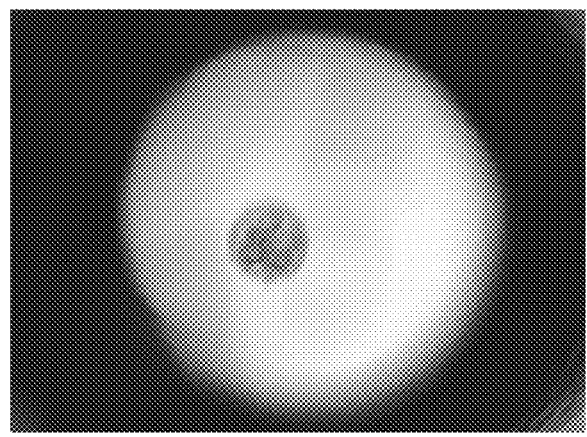

[Fig. 14]
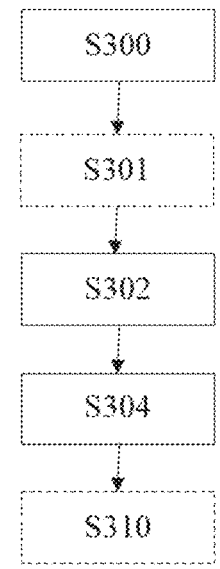
[Fig. 15]
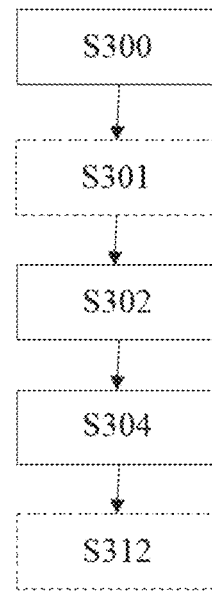

[Fig. 16]
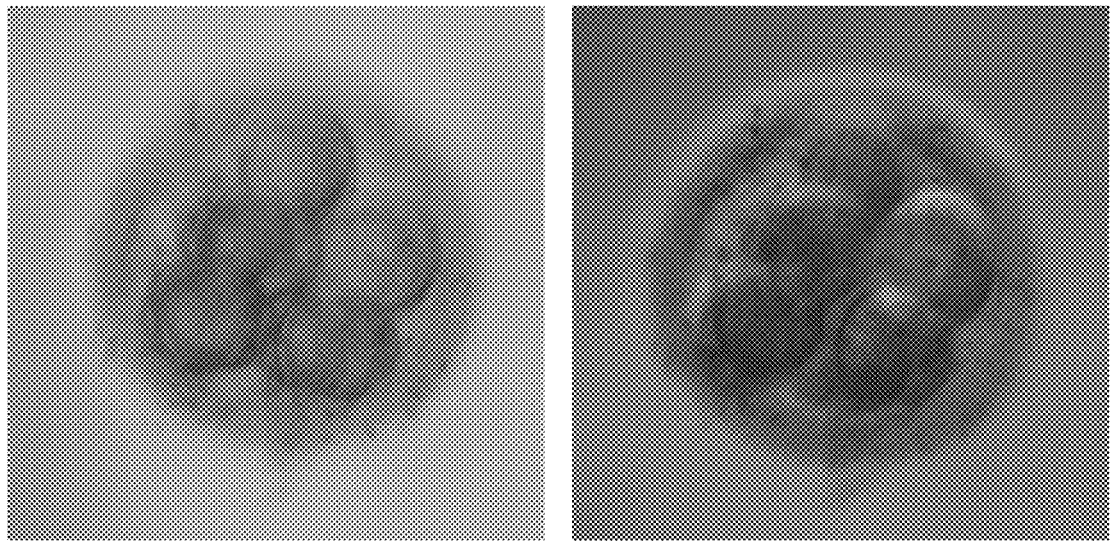
[Fig. 17a]
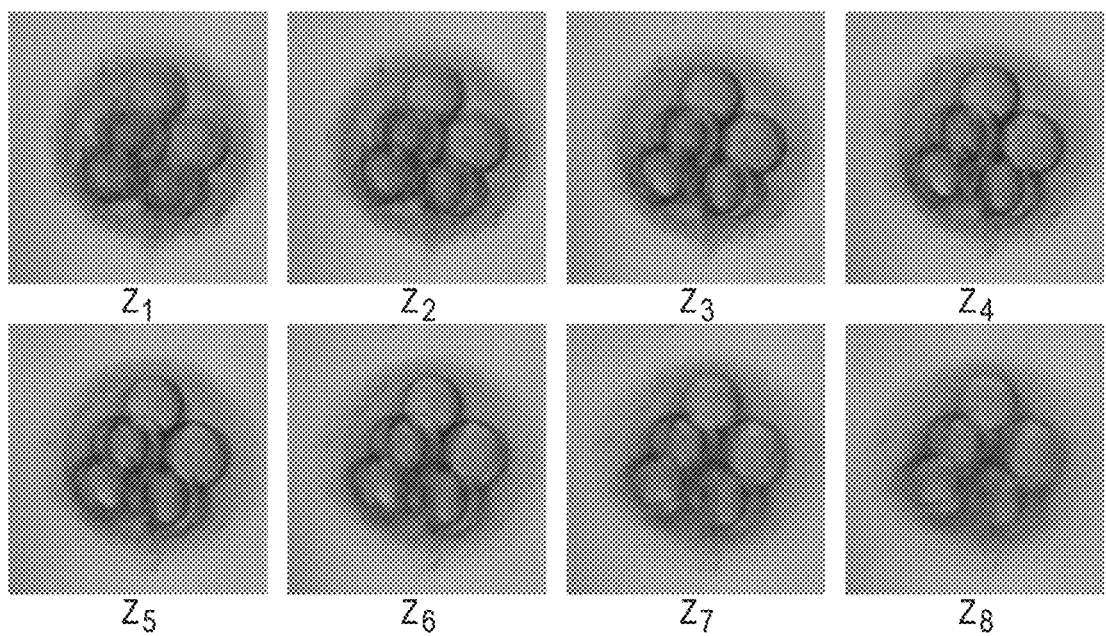
$Z_1$  $Z_2$  $Z_3$  $Z_4$
$Z_5$  $Z_6$  $Z_7$  $Z_8$

[Fig. 17b]
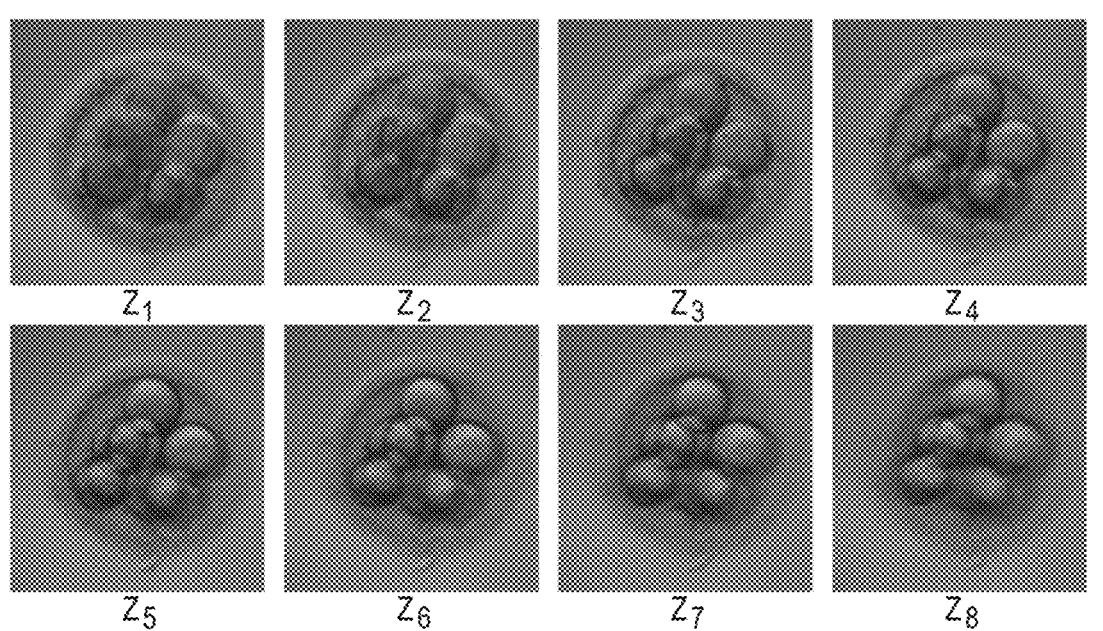

DEVICE FOR OBSERVING A LIVING CELL OR A SET OF LIVING CELLS

CROSS-REFERENCE TO RELATED APPLICATIONS

The present application is a filing under 35 U.S.C. 371 as the National Stage of International Application No. PCT/FR2020/051277, filed Jul. 16, 2020, entitled "DEVICE FOR OBSERVING A LIVING CELL OR A SET OF LIVING CELLS," which claims priority to French Application No. 1908163 filed with the Intellectual Property Office of France on Jul. 18, 2019, both of which are incorporated herein by reference in their entirety for all purposes.

STATEMENT REGARDING FEDERALLY SPONSORED RESEARCH OR DEVELOPMENT

Not Applicable

Incorporation-by-Reference of Material Submitted on a Read-Only Optical Disc, as a Text File or an Xml File Via the Patent Electronic System Not Applicable

Statement Regarding Prior Disclosure by the Inventor or a Joint Inventor

Not Applicable

BACKGROUND

The present invention relates to an imaging device for observing a living cell or a set of living cells in the context of studying reproduction and in particular for In Vitro Fertilisation (IVF).

More specifically, the invention relates to an imaging device for observing a living cell or a set of living cells, an associated Petri dish as well as a method and a computer program product suitable for this observation.

DESCRIPTION OF RELATED ART

Current imaging devices for observing a living cell or a set of living cells such as embryos are mostly microscopes equipped with different magnification lenses, a monocular or binocular direct observation system and generally an offset observation system for viewing the living cell or set of living cells on a video screen.

The living cell or set of living cells are placed on a support then are observed using different lens for magnifying or reducing the size of the images obtained and thus viewing the living cell or set of living cells according to different magnifications and therefore in detail or overall.

These devices are not very precise in terms of handling, or easy to use. It is necessary to start by viewing the living cell or set of living cells with a low magnification to locate it and centre it in the microscope field by moving it manually and then changing lens using increasing magnifications to view the living cell or set of living cells in detail.

In the specific example of observing embryo development and performing In Vitro Fertilisation (IVF), the embryos intended to be implanted are selected according to the cellular quality thereof, i.e.: the cell count thereof, the regularity thereof (cells of different sizes or not), and the fragmentation thereof. The embryos selected are, as a priority, those in which the chronology of cell division is observed, with regular cells and with no fragmentation. These parameters are supposed to be an indicator of better chances of pregnancy.

This observation is generally performed outside embryo culture enclosures adapted to recreate an ideal environment, in temperature and in gas concentration, for good embryo development. The document US 2015/0278625 A1 describes such an observation mode outside an incubator. However, it was demonstrated that observation outside chambers and particularly the sudden change of environment for embryos plays a potentially harmful role in the development thereof.

Embryo imaging devices have therefore been developed in the context of In Vitro Fertilisation (IVF) techniques in order to enable an in vitro observation of embryo development, after fertilisation, in this type of environment ideal for the development thereof.

This observation can be continued over 2 to 5 days depending on the IVF centres, and enables a better selection of the embryos to be transferred into the patient's genital tract, and therefore helps improve IVF success rates.

There are two existing categories of observation devices, either the observation device is integrated directly into a system adapted to recreate the ideal environment for good embryo development, with individual culture chambers comprised receiving specific dishes for each device; or the observation device is individual and to be placed in pre-existing enclosures with dishes that are also specific for observation.

All these specificities render current devices as well as the use thereof very costly, thus limiting the access thereof for medical facilities with a restricted budget or requiring an increase in the fees and/or costs of treatment for IVF beneficiaries.

In any case, whether in the case of living cells or sets of living cells, or in the specific case of embryos, the optical quality of the images, the accurate identification of the living cells or sets of living cells, and regular temporal tracking of the development thereof are essential parameters for the use of these methods. However, on one hand, current systems do not allow accurate location of the living cells or sets of living cells, the latter being confined in the reduced spaces limiting the observation field in the 3 x, y and z axes. In the case of an embryo, the natural movements thereof may make it come out of the observable zone without the option of relocation or display it at the field edge, where the optical aberrations are greater; on the other, observation in a single incidence has to date made it impossible to create algorithms capable of aiding interpretation.

Another important parameter is the observation time of the living cells or sets of living cells, forming samples, which impacts the efficiency of the analyses performed thereon. Current devices generally have means for mechanical movement along 3 axes commonly referred to as x, y (defining a horizontal plane containing the samples to be observed) and z (perpendicular direction to the preceding plane, in the direction of sample depth) in order to position the samples optimally. These mechanical movement means make potentially time-consuming movements. A solution in the prior art for reducing the depth movement time is that of using a liquid lens, the focal distance whereof can be varied electronically, as in the patent applications relating to the dental field US2014/0002626 A1, relating to an autofocus intrabuccal camera, and EP 2 161 607 A1, relating to a dental camera.

There is therefore a real need for an imaging device overcoming the failings, drawbacks and obstacles of the prior art, in particular for a device and a method making it possible to improve the optical quality and the temporal efficiency of the observation of living cells or sets of living cells, while reducing the costs of device manufacture and use. In the specific case of IVF, better accessibility, through a reduction in cost, for those concerned, is sought.

BRIEF SUMMARY

To solve one or more of the drawbacks cited above, the applicant particularly proposes
an imaging device for observing the development of living cells or sets of living cells (80) in the context of reproduction study and in particular for In Vitro Fertilisation (IVF), characterised in that it comprises:
  an imaging system comprising a wide-field camera adapted for the identification observation of one or more living cells or sets of living cells to be observed, the living cells or sets of living cells being deposited in a Petri dish containing a specific compartment for each living cell or set of living cells;
  a support capable of receiving the Petri dish and positioned between the lighting system and the imaging system;
  a lighting system comprising three light sources, adapted to illuminate an object which is a living cell or a set of living cells to be observed, including a central source, a first lateral source placed on a first side of the central source, and a second lateral source placed on a second side of the central source,
  the lighting system being configured to implement each of the following types of lighting:
    a "detection" type lighting wherein said light source (111) is configured for detecting the living cell(s) or sets of living cells to be observed by the imaging system, said "detection" type lighting being produced using the central source, the first lateral source and the second lateral source, the light rays from the light sources being focused on the object according to a cone having an angular aperture between 26° and 34°;
    a "contour" type lighting wherein said light source (111) is configured for counting the cell(s) present in the living cell or set of living cells observed by the imaging system, said "contour" type lighting being produced using the first lateral source and the second lateral source, the rays from the first lateral source and the second lateral source being separated into two symmetrical collimated beams with respect to the perpendicular axis to the plane formed by the Petri dish support or the Petri dish per se, a first beam from the first lateral source illuminating the object according to an angle of incidence with respect to the perpendicular axis between 10° and 14°, a second beam from the second lateral source illuminating the object according to an angle of incidence with respect to the perpendicular axis between 10° and 14°;
    a "relief" type lighting wherein said light source (111) is configured for viewing the texture and granularity of the cell(s) present in the living cell or set of living cells observed by the imaging system, said "relief" type lighting being produced using the first lateral source, a single collimated light beam from the first lateral source propagating along an axis inclined by an angle with respect to the perpendicular axis between 8° and 16°;
  means for relative movement of the Petri dish with respect to the assembly formed by the lighting system and said wide-field camera so as to be able to observe living cells or sets of living cells located in the different compartments of the Petri dish,
  said wide-field camera having a field of view covering at least the total surface area of one of the compartments of the Petri dish, and said imaging device being adapted to image, without relative movement of said Petri dish with the movement means with respect to the assembly formed by the lighting system and said wide-angle camera, a living cell or a set of living cells in any position in the compartment thereof in the Petri dish and said wide-angle camera having a resolution adapted for observing the details of a living cell or a set of living cells, said details having a micrometric size.

The specific lighting system of the device according to the invention makes it possible to render the device compact, multifunctional, and not requiring any removal of parts to switch from one type of lighting to another. Handling operations are reduced to those strictly necessary, the ease of use, in the long term, directly in the incubator, without any risk of disruption for the embryo, offers ideal observation conditions.

"Contour" type lighting makes it possible to readily count the number of cells, in a single view, including when the cells are stacked.

"Relief" type lighting provides information on the texture of the cell envelope. This lighting is present in two opposite directions (up/down) providing additional information that may be useful for understanding the geometry of the embryo, thus forming the third combination.

The field of view of the wide-field camera, covering at least the total surface area of one of the compartments of the Petri dish, thus makes it possible to image directly, without using movement means, a living cell or a set of living cells positioned in any position in the compartment thereof in the Petri dish.

"Wide-field" camera according to the invention particularly denotes a camera having a field of view greater than 1 mm$^2$, with a pixel resolution less than 1 µm.

Preferably, the living cells or sets of living cells to be observed are one or more embryos.

Preferably, in the imaging device according to the invention, the lighting system can be chosen from at least one of the following specific types of lighting:
  a "detection" type lighting wherein said light source is configured for detecting the living cell(s) or sets of living cells to be observed by the imaging system;
  a "contour" type lighting wherein said light source is configured for counting the cell(s) present in the living cell or set of living cells observed by the imaging system;
  a "texture" type lighting wherein said light source is configured for viewing the texture and granularity of the cell(s) present in the living cell or set of living cells observed by the imaging system.

In an embodiment of the imaging device according to the invention, said light source of the lighting system can be disposed in a parallel plane with the horizontal plane defined by the support capable of receiving the Petri dish, and a device for shaping the beams emitted by said at least one light source can be disposed between said light source and the Petri dish.

According to an alternative embodiment, the movement means can be capable of moving the Petri dish wherein the living cells or sets of living cells to be observed are deposited relative to the assembly formed by the lighting system and the wide-field camera of the imaging system.

According to another alternative embodiment, the movement means can be capable of moving the assembly formed by the lighting system and the wide-field camera of the imaging system relative to the Petri dish wherein the living cells or sets of living cells to be observed are deposited.

Advantageously, the imaging system is adapted for counting the number of cells present in the living cell or set of living cells observed.

Also advantageously, the system is adapted for viewing the texture and granularity of the cells present in the living cell or set of living cells observed.

In an embodiment, the imaging device can further comprise a liquid lens, adapted to control the focal distance of the living cell or set of living cells in the direction of the depth thereof.

The present application also relates to a Petri dish for observing the development of living cells or the set of living cells by an imaging device according to the invention, said Petri dish comprising:
- a receptable adapted to receive one or more living cells or sets of living cells to be observed,
- a lid,
- an identification element adapted for identifying the living cell(s) or sets of living cells observed,
- specific compartments or wells intended for depositing a living cell or a set of living cells, said compartments or wells being produced in the form of cups adapted to receive, in addition to the living cell or set of living cells in the cup, a drop of a culture medium.

The present application also relates to a method for observing the development of living cells or sets of living cells by an imaging device according to the invention, comprising the following steps:
- a preparation step of successively depositing a living cell or a set of living cells into a Petri dish as defined above and which can be chosen from at least one Petri dish disposed on the device support, followed by a drop of a culture medium in said Petri dish, the operation being repeated as many times as needed according to the sought number of living cells or sets of living cells to be observed; then covering the whole with a liquid, such as oil or water;
- a step of identifying the Petri dish of detecting and viewing, using a dedicated reader, the identification element of the Petri dish containing the living cell(s) or sets of living cells to be observed; and
- a step of observing a first living cell or set of living cells using the imaging system.

Advantageously, an optional step, prior to the step of identifying the Petri dish, of approximate positioning of the Petri dish with respect to the assembly formed by the lighting system and the wide-field camera of the imaging system relative to the Petri dish using the movement means is carried out, such that the Petri dish is roughly aligned with the lighting system and the wide-field camera of the imaging system;

Advantageously, the method for observing the development of living cells or sets of living cells can comprise, after the step of observing a first living cell or a first set of living cells, a step of relative movement of the Petri dish with respect to the assembly formed by the lighting system and the wide-field camera of the imaging system for observing another living cell or another set of living cells located in another compartment of the Petri dish.

In the embodiment wherein the imaging device according to the invention further comprises a liquid lens, the step of observing a first living cell or a first set of living cells in the method for observing the development of living cells or sets of living cells can be performed in a horizontal observation plane parallel with the support capable of receiving the Petri dish and perpendicular to the direction of the depth of said first living cell or of said set of living cells, said plane being determined in an additional determination step by a configuration of the liquid lens.

Advantageously, in the same embodiment wherein the imaging device according to the invention further comprises a liquid lens, the step of determining an observation plane of said first living cell or of said set of living cells is repeated for different planes perpendicular to the direction of the depth of said first living cell or of said set of living cells by different configurations of the liquid lens, so as to observe a first living cell or a first set of living cells in the different observation planes determined.

The observation in different planes perpendicular to the direction of the depth of said first living cell or said set of living cells permitted by the presence of a liquid lens in the imaging device according to the invention thus makes it possible to do away with movement in the direction of the depth of said first living cell or said set of living cells, and thus save time in the procedure for analysing and observing the living cell(s) or sets of living cells.

The present application also relates to a computer program product downloadable from a communication network and/or recorded on a computer-readable medium and/or executable by a processor, characterised in that it comprises program code instructions for implementing the method for observing and developing living cells or sets of living cells according to the invention.

BRIEF DESCRIPTION OF THE DRAWINGS

Further advantages and specificities of the present invention will result from the following description, given by way of non-restrictive example, with reference to the appended figures:

FIG. 1 represents a first embodiment of an imaging device according to the invention;

FIG. 2 represents a first embodiment of a "detection" type lighting;

FIG. 3 represents a first embodiment of a "contour" type lighting;

FIG. 4 represents a first embodiment of a "texture" type lighting;

FIG. 5 represents a second embodiment of an imaging device according to the invention;

FIG. 6 represents an imaging device according to another embodiment of the invention disposed inside an incubator;

FIG. 7a represents a profile view of the imaging device disposed inside an incubator in FIG. 6;

FIG. 7b represents a top view of the imaging device disposed inside an incubator in FIG. 6;

FIG. 7c represents another top view of the imaging device disposed inside an incubator in FIG. 6;

FIG. 8a represents several two-dimensional views (top, side, transverse section) of a Petri dish example that can be used in the invention;

FIG. 8b represents a 3D view of the Petri dish example in FIG. 8a;

FIG. 9a represents a profile view of an embodiment of a Petri dish, according to the invention, placed on a support;

FIG. 9b represents a top view of the Petri dish in FIG. 9a placed on a support;

FIG. 10 represents an embryo reservoir present on the bottom of a Petri dish according to an embodiment of the invention;

FIGS. 11a to 11c represent another embodiment of a Petri dish according to the invention, respectively FIG. 11a represents a profile view, FIG. 11b a top view and FIG. 11c a section of the profile of the Petri dish;

FIG. 12 represents the synoptic of a method for observing the development of a living cell or set of living cells according to a first embodiment of the invention;

FIG. 13 represents a full-field image obtained by the first embodiment of the observation method according to the invention with the wide-field camera of the imaging system of the imaging device according to the invention;

FIG. 14 represents the synoptic of a method for observing the development of a living cell or set of living cells according to a second embodiment of the invention;

FIG. 15 represents the synoptic of a method for observing the development of a living cell or set of living cells according to a third embodiment of the invention;

FIG. 16 show two images of an embryo obtained with an imaging device and according to the first embodiment of the observation method according to the invention, with two different types of lighting, respectively a "contour" type lighting on the left and a "texture" type lighting on the right;

FIG. 17a represents a succession of transverse sections of an embryo in the depth thereof obtained with a device according to the invention and according to the third embodiment of the observation method according to the invention, using a "contour" type lighting;

FIG. 17b represents a succession of transverse sections of an embryo in the depth thereof obtained with a device according to the invention and according to the third embodiment of the observation method according to the invention, using a "texture" type lighting.

FIGS. 16 to 17b are commented upon in more detail in the following examples, which illustrate the invention without limiting the scope thereof. The other figures, describing different embodiments of the device, of the Petri dish and of the observation method according to the invention and used or implemented in the examples, are detailed hereinafter.

DETAILED DESCRIPTION OF THE INVENTION

An imaging device 100 according to a first embodiment of the invention as illustrated in FIG. 1, is embodied from the following elements:

lighting system 110: LED (light-emitting diodes) type lighting imaging system 120 comprising a wide-field camera 121 equipped with an image sensor having a resolution of the order of 5 pixels per 1 micrometre observed a support 1: a sheet of glass relative movement means such as motorised plates.

These elements are indicated by way of example, and the device according to the invention can be embodied with elements having different parameters.

The imaging device 100 embodied is intended to observe a living cell or a set of living cells 80 contained in a Petri dish 10 placed on the support 1. The term "observe" denotes detecting and distinguishing the details of a structure.

In the embodiment shown in FIG. 1, the device 100 is embodied in "inverted microscope" configuration, i.e. the cell or set of living cells observed 80 is illuminated from above and the imaging system 120 is located underneath and observes the light transmitted by the living cell or set of living cells 80 which is a translucent object. Hereinafter in the description, this configuration is retained, however, the device 100 can also be embodied in "normal" configuration (the cell or set of living cells 80 illuminated from below and observed from above as with a standard microscope), as in "inverted" configuration.

Image capture by the wide-field camera 121 is performed in transmission through the cell or the set of living cells 80 i.e. by the so-called diascopy technique. This means that the lighting is located on one side of the object to be imaged and the camera on the other side of the object.

Thus the Petri dish 10 containing the living cell(s) or sets of living cells 80 to be observed must be transparent to the light used to illuminate the living cell(s) or sets of living cells 80. The Petri dish 10 is placed on the support 1, as in the embodiment described in FIG. 1. This support 1 must also be transparent to the light used to illuminate the living cell or set of living cells 80, such as a sheet of glass for conventional microscopes in which the light is a bulb emitting in the visible range. In the device shown here, this support 1 is a sheet of glass but can also be a sliding drawer whereon one or more Petri dishes 10 can be deposited.

Advantageously, this support 1 can comprise contact blocks or a rim for pre-positioning the Petri dish(es) 10 on predefined positions. In this case, no preliminary lateral setting, i.e. in a plane parallel with the plane defined by the support 1, is necessary to observe a living cell or a set of living cells 80 thanks to the wide field of view of the wide-field camera 121 which, covering at least the entirety of the compartment 61, also referred to as well or cup, of a Petri dish 10 makes it possible to directly detect a living cell or a set of living cells 80 regardless of the position thereof in the compartment 61 thereof.

Advantageously, the lighting system 110 and the wide-field camera 121 are rigidly connected and mounted on a "U"-shaped structure such that the lighting system 110 is facing the wide-field camera 121 as in FIG. 1.

Advantageously, the lighting system 110 is chosen from at least one of the following specific types of lighting:

"detection" type lighting wherein the at least one light source 111 is configured for detecting the living cell(s) or sets of living cells 80 to be observed by the imaging system 120

"contour" type lighting wherein the at least one light source 111 is configured for counting the cell(s) present in the living cell or set of living cells 80 observed by the imaging system 120; and "relief" type lighting wherein the at least one light source 111 is configured for viewing the texture and granularity of the cell(s) present in the living cell or set of living cells 80 observed by the imaging system 120.

"Detection" type lighting is preferably used for detecting and viewing, by the imaging system 120, for imaging and analysing an identification element 50 present on the Petri dish 10 and for identifying the living cell(s) or set of living cells 80 to be observed. Thus the choice of the at least one light source 111 and of the wide-field camera 121 must be configured. For example, the sensitivity of the wide-field camera 121 must be optimised according to the wavelength emitted by the light source 111.

This "detection" type lighting can also be used to aid the detection of the living cell or set of living cells 80 by the wide-field camera 121 and imaging system 120.

FIG. 2 represents an embodiment of a "detection" type lighting. In this FIG. 2, the object to be identified or detected using the wide-field camera 121 and the imaging system 120, which can be the identification element 50 of the Petri dish or as in FIG. 2 the living cell or set of living cells 80, is illuminated by homogeneous or diffuse type lighting. The light rays 112 from the light source 111 are concentrated or focused on the object to be identified or detected, in a cone having an angular aperture $\alpha\_GC$ of the order of 30°. The object observed (identification element 50 or living cell or set of living cells 80) is therefore illuminated according to angles of incidence varying between −15° and +15° with respect to the perpendicular axis P to the plane formed by the support 1 of the Petri dish 10 or the Petri dish 10 per se.

The cone of angular aperture $\alpha\_GC$ is of the order of 30°+4°. The angles of incidence vary between −15°±2° and +15°±2°.

FIG. 3 represents an embodiment of a "contour" type lighting. In this FIG. 3, the living cell or set of living cells 80 to be observed by the wide-field camera 121 can be illuminated along preferably symmetrical axes with respect to the perpendicular axis P to the plane formed by the support 1 of the Petri dish 10 or the Petri dish 10 per se. Thus, the rays from the at least one light source 111 are separated into two collimated beams 113 and 114. The first beam 113 illuminates the embryo 80 according to an angle of incidence $\beta\_PC1$ with respect to the perpendicular axis P and the second beam 114 illuminates the embryo 80 according to an angle of incidence $\beta\_PC2$. As mentioned above, the angles $\beta\_PC1$ and $\beta\_PC2$ are preferably equal and opposite (i.e. $\beta\_PC1 = -\beta\_PC2$), i.e. the beams 113 and 114 are preferably symmetrical with respect to the perpendicular axis P. Typically, the angles $\beta\_PC1$ and $\beta\_PC2$ are of the order of +/−12°±2°. The total angle between the two directions formed by the beams 113 and 114 is therefore typically of the order of 24°±4°. The high resolution of the wide-field camera 121 (for observing the details of a living cell or set of living cells 80, said details having a micrometric size) cooperates with this "contour" type lighting.

"Texture" type lighting is preferably used to optimise the viewing, by the imaging system 120, of the texture and granularity of the cells present in the living cell or set of living cells 80 observed so as to assess the relief thereof and depth thereof.

FIG. 4 represents an embodiment of a "texture" type lighting. In this FIG. 4, the living cell or set of living cells 80 to be observed by the wide-field camera 121 and the texture and granularity whereof are to be viewed, can be illuminated by a single light beam 115. This beam 115 is collimated and propagates along an axis inclined by an angle $\gamma\_PC$ with respect to the perpendicular axis P. The absolute value of this angle $\gamma\_PC$ typically varies between 8° and 16°. No direction of incidence is to be preferred with respect to the perpendicular axis P or the living cell or set of living cells 80.

To facilitate the embodiment of these different lightings, the lighting system 110 can be composed of one or more light sources 111, of LED type. Each of these light sources 111 can be controlled individually. It should be noted that LEDs have the advantage of being very compact such that it is possible to duplicate the lighting by a set of LEDs such that an LED illuminates a living cell or set of living cells 80.

In the specific case wherein the set of living cells to be observed is an embryo, the wavelength of the at least one light source 111 used (LED or other) can be located, preferably, in the red range (around 630 nm), which is the least harmful range for the embryo 80. Furthermore, it is preferable that the light source 111 be controlled in pulsed mode so as to limit the cumulative exposure time of the embryo 80 to light to a few dozen seconds per day, so as not to damage it.

FIG. 5 illustrates an embodiment of the invention wherein the lighting system 110 comprises several light sources 111a, 111b, 111c, three in this example, i.e. a central source 111b, a first lateral source 111a placed on one side of the central source 111b, and a second lateral source 111c placed on a second side of the central source 111b. The plane A of FIG. 5 corresponds to the orthogonal plane P of FIGS. 2 to 4. Plane A passes through the central source 111b.

To collimate the light emitted by the light source 111 and emit homogeneous lighting or emit diffuse lighting, the lighting system 110 may further comprise an optical system 140 for shaping the light beam emitted by the light source 111, such as a lens or a lens array, filters, etc.

To adjust the zone to be illuminated, this optical shaping system 140 may also comprise a mask, such as a plate with a hole, capable of being moved so as to allow the light from the light source 111 to pass so that the latter illuminates the living cell or set of living cells 80 to be observed. This can particularly be the case if the at least one light source 111 is expanded or if the lighting system 110 comprises several light sources 111 that can optionally be controlled separately. Furthermore, the use of such a mask also makes it possible to filter parasitic light that might disturb the observation of the living cell or set of living cells 80.

Thus, in the context of FIG. 5, to produce "texture" type lighting and illuminate the living cell or set of living cells 80 to be observed on the side, the light source 111b located over the embryo 80 could be switched off and one of the two light sources 111a or 111c located on the sides of the central light source 111b could be switched on thus projecting an oblique light on the living cell or set of living cells 80.

The imaging system 120 is located, in the case of FIGS. 1 and 5, below the Petri dish 10 and therefore the living cell or set of living cells 80 to be observed (inverted microscope principle). It comprises the wide-field camera 121 adapted for identifying a living cell or set of living cells 80 to be observed, the living cell or set of living cells 80 being deposited in an adapted Petri dish 10.

For this, the wide-field camera 121 can be set such that the latter can image an identification element 50 present on the Petri dish 10 thus enabling the identification of the living cell or set of living cells 80 to be observed. For this, the imaging system 120 can further comprise a processing unit which analyses the image captured by the wide-field camera 121 to detect the position of the identification element 50 and the position of the living cell(s) or set of living cells 80 to be observed using the features of the Petri dish 10.

In the case wherein the living cell or set of living cells 80 is one or more embryos, this processing unit also makes it possible to analyse the image captured by the wide-field camera 121 when the latter is positioned, using the movement means 160, so as to image the identification element 50 of the Petri dish 10, so as to find in a previously completed database the information relating to the content of the Petri dish 10, i.e. the embryo(s) 80, such as the couple to whom the embryos 80 belong, the number of embryos 80 present in the dish, the date of preparation and insertion of the embryos 80, etc.

Thanks the high resolution thereof, the wide-field camera 121 is adapted to image an illuminated living cell or set of living cells 80 and for observing the development thereof. The wide-field camera 121 is typically equipped with an image sensor of a resolution of the order of 5 pixels per 1 μm observed and provided with a quantity of pixels capable of covering the entire surface area of the well observed, this surface area being supplemented by a surface area ensuring a safety margin in terms of forecasting positioning uncertainties.

Furthermore, so as to be able to separate the different cell layers present in the living cell or set of living cells 80, the wide-field camera 121 must have a relatively small field depth, of the order of 100 μm.

To view the different cell layers and therefore observe the living cell or set of living cells 80 in the depth thereof, the imaging device 100 can further comprise a liquid lens, adapted to control the focal distance of the living cell or set of living cells 80 in the direction of the depth thereof, i.e. along an axis Z perpendicular to the plane defined by the Petri dish 10 or defined by the support 1. For example, a liquid lens 170 configured by actuation by electrowetting, or using an electroactive polymer membrane, or configured by a piezoelectric actuator can be used. In the case of a liquid lens 170 configured by actuation by electrowetting, a voltage is used to modify the shape of the interface separating two different liquids, and thus modifies the focal distance of the liquid lens 170. In the case of a liquid lens 170 using an electroactive polymer membrane, the focal distance of the liquid lens 170 is also modified by applying an electric voltage between an electrode and a substrate, thus modifying the curvature of the liquid lens 170. In the case of a liquid lens 170 configured by a piezoelectric actuator, the latter has the effect of swelling a membrane filled with liquid. The plane corresponding to the cell layer to be observed is thus configured by configuring the liquid lens. Thus, the advantage is being able to do away with a means for moving along the z axis, the actuation whereof is time-consuming.

Thanks to the processing unit, the imaging system 120 can be used to count the number of cells present in the living cell or set of living cells 80 observed. For this, the processing unit of the imaging system 120 can analyse the images captured by the wide-field camera 121 and, via imaging processing operations such as contour detection, makes it possible to count the number of cells present in the living cell or set of living cells 80 observed.

The counting and particularly the image processing operations are optimum when the living cell or set of living cells 80 observed is illuminated using "contour" type lighting.

The imaging system 120 can also be used to view the texture and granularity of the cells present in the embryo 80 observed. For this, the processing unit of the imaging system 120 analyses the images captured by the wide-field camera 121 and processes them with image processing operations optimising the visual rendering of the texture and the grain of the cells present in the living cell or set of living cells 80 observed.

As illustrated in FIG. 5, the imaging system 120, and particularly the wide-field camera 121, can advantageously be offset using an optical return system 150, so as to render the device 100 more compact. This optical return system 150 can consist for example of a lens 152 and a return mirror 151 positioned at 45° with respect to the optical axis A of the imaging device 100, in dotted lines in FIG. 5.

In the case where the living cell or set of living cells 80 is an embryo or several embryos, as illustrated in FIG. 6, the dimensions of the imaging device 100 are preferably compatible with the incubators 200 found in IVF centres so that it can be disposed inside such incubators 200. Thus, the height and depth of the device 100 can be of the order of 30 cm and the width of the device 100 can be of the order of about 30 cm to 55 cm.

The imaging device 100 in FIG. 6 includes a sliding drawer whereon one or more Petri dish 10 can be deposited as described above.

FIG. 7a represents a profile view and 7b and 7c represents top views of the imaging device 100 in FIG. 6 present in an incubator 200. In this case, the support 1 covering the entire width of the imaging device 100, it is the assembly formed by at least the lighting system 110 and the wide-field camera 121 secured to an "elongated U"-shaped structure which is moved by the relative movement means 160 in a plane (X, Y) parallel with that defined by the support 1 so as to be able to view either another embryo 80 from the same Petri dish 10, or an embryo 80 in another Petri dish 10.

Secondly, a Petri dish 10 adapted for the observation of the development of living cells or sets of living cells 80 by an imaging device 100 as defined above will be detailed hereinafter.

According to a first embodiment, such a Petri dish 10 can comprise:
  a receptacle 20 adapted to receive one or more embryos 80 to be observed; and
  a lid 30.

FIG. 8a shows two-dimensional top and profile views as well as a section AA of an example of a Petri dish that can be used with the scope of the invention. An example of a receptacle 20 and an example of a corresponding lid 30 is observed therein. FIG. 8b shows a relief representation of the receptacle 20 and the lid 30 in FIG. 8a.

A schematic view of this first embodiment of the Petri dish 10 is illustrated in FIG. 9a.

So as to be able to view the living cells or sets of living cells 80 through the Petri dish 10, the latter can be made of a material transparent to the light emitted by the lighting system 110 as described above. This light is generally in the visible range (i.e. approximately between 400 nm and 800 nm). Thus the material used can be glass of a plastic material for example.

With reference to FIG. 9b, the bottom of the receptacle 20 comprises an identification element 50 adapted for identifying the living cell(s) or set(s) or living cells 80 observed.

According to the embodiment shown in FIG. 9b, the Petri dish 10 is of rectangular shape.

The identification element 50 can for example be a barcode or a 2D code, of data-matrix type as represented in FIG. 9b. This identification element 50 particularly makes it possible to know the information relating to the contents of the Petri dish 10, i.e. to the living cells or sets of living cells 80 contained therein. In the case where the living cell(s) or sets of living cells 80 are one or more embryos, the information relating to the contents of the Petri dish 10 can be for example the couple to whom the embryos 80 belong, the number of embryos 80 present in the dish, the date of preparation or insertion of the embryos 80, etc. via a previously completed database.

According to this embodiment, the living cells or sets of living cells 80 are distributed linearly over one or more rows as is the case for the rectangular Petri dish 10 illustrated in FIG. 9b.

According to a specific embodiment of the Petri dish 10 illustrated in FIG. 10, the bottom of the receptacle 20 can advantageously comprise at least one embryo reservoir 60 comprising at the centre thereof a cup 61, or compartment, or well, adapted to receive a living cell or a set of living cells 80, the reservoir 60 also being adapted to receive, in addition to the living cell or set of living cells 80 in the cup 61, a drop of a culture medium 62 (typically of the order of 6 µl). The diameter of the cup can be typically of the order of 1 mm and the capacity thereof of the order of 0.75 µl. The zone where the culture medium 62 is located is delimited by a raising of the bottom of the receptacle 20 or bulge 64.

The assembly formed by at least the living cell or set of living cells 80, the drop of culture medium 62 can then be covered with a liquid 63 such as oil or water. For this, the edges of the receptacle 20 must be sufficiently high, typically of the order of 5 to 10 mm. According to another embodiment, illustrated in FIGS. 11a to 11c and similar to that shown in FIGS. 9a and 9b, the Petri dish 10 can be rigidly connected to a transparent plate 11 comprising a gripping lug 12 enabling easy handling of the Petri dish 10. This prevents the risk of soiling the bottom of the receptacle 20 or the lid 30 which would interfere with the observation of the embryo 80 and the quality of the images captured by the device 100. Advantageously, the gripping lug 12 comprises a tagging area 13 whereon it is possible to affix the identification element 50 rather than on the bottom of the receptacle 20.

Finally, the edges of the receptacle 20 are sufficiently high so as to be able to deposit a quantity of liquid 63, such as oil, or water, to cover the assembly formed by the drop of culture medium 62 and the living cell or set of living cells 80, typically of the order of 5 to 10 mm.

According to the embodiment, the identification element 50 can be produced directly in the material, by machining the bottom of the receptacle 20 on the inner or outer face thereof, or by affixing a label and/or self-adhesive markers on the outside bottom of the receptacle 20.

Thirdly, a method for observing the development of living cells or sets of living cells 80 by an imaging device 100 as defined above will be detailed hereinafter.

According to a first general embodiment of the method illustrated in FIG. 12, the method can comprise three main steps:
 a preparation step S300;
 an identification step S302; and
 an observation step S304.

The preparation step S300 involves successively depositing a living cell or a set of living cells 80 followed by a drop of a culture medium 62 (or conversely a drop of a culture medium 62 followed by a living cell or a set of living cells 80) then repeating the operation according to the sought number of living cells or sets of living cells 80 to be observed and finally covering the whole with a liquid 63, such as oil, or water, in a Petri dish 10 as defined above and that can be chosen from at least one Petri dish disposed on the support of the device.

The living cell or set of living cells 80 can be deposited in the cup 61 then covered with a drop of a culture medium 62 in the living cell or set of living cell reservoir 60.

Advantageously, and particularly in the case where the living cell or set of living cells 80 is an embryo or several embryos, following the operation of preparing or depositing embryos 80, a database can be filled by the preparation technician with the characteristics of the Petri dish 10 and especially the data associated with the embryos 80 deposited in the Petri dish 10 such as: the couple to whom the embryos 80 belong, the number of embryos 80 present in the dish, the date of preparation and insertion of the embryos 80, etc.

The identification step S302 of the living cell or set of living cells 80 to be observed involves imaging and analysing, using the imaging system 120, the identification element 50 of the Petri dish 10 containing the living cell or set of living cells 80 to be observed.

Advantageously, an optional step S301, referred to as approximate positioning step S301 can be carried out prior to the step, referred to as identification step S302, said optional step S301 involving moving relative to one another the assembly formed by the lighting system 110 and the wide-field camera 121 of the imaging system 120 and the Petri dish 10 using the movement means 160, such that the Petri dish 10 chosen is roughly aligned with the assembly formed by the lighting system (110) and the wide-field camera (121) of the imaging system (120).

Thus, in the case where several Petri dishes 10 are disposed on the support, it is simply necessary to position the imaging system 120, during an optional step S301, above a chosen Petri dish 10 so that the latter is directly identified, particularly by identifying the identification element 50 with the wide-field camera 121, by moving the assembly formed by the lighting system 110 and the wide-field camera 121 of the imaging system 120.

Then the processing unit of the first imaging system 120 can analyse the image captured by the wide-field camera 121 and makes it possible to analyse the identification element 50 to link with the characteristics of the Petri dish 10 observed via a previously filled database.

The observation step S304 involves imaging a first living cell or set of living cells 80 using the imaging system 120.

In a configuration where the support 1 comprises contact blocks or rims, or notches for pre-positioning a Petri dish 10 on predefined positions, the latter is thus pre-positioned therein. No preliminary lateral setting, i.e. in a parallel plane with the plane defined by the support 1, is necessary to position the imaging system 120 and the wide-field camera 121 relative to the Petri dish 10 as the wide field of view of the wide-field camera 121 covers at least the entirety of a compartment 61, or well, of the Petri dish 10. This makes it possible, from the start-up of the imaging system 120, after defining the observation plane of the living cell or set of living cells 80 by configuring the wide-field camera 121, to directly detect a living cell or a set of living cells 80 positioned in one of the compartments 61 of the Petri dish 10 in place, regardless of the position of the living cell or set of living cells 80 in the compartment 61 thereof. Thus, the lighting system 110 illuminates the first living cell or set of living cells 80 and the wide-field camera 121 captures the image thereof. FIG. 13 shows a full image of an embryo obtained with the observation method described above, the image being particularly obtained after the step S304. It is possible to observe therein the embryo positioned on the left side of the compartment 61 thereof in the Petri dish 10 and distinguish the constituent cells thereof.

Advantageously, during this observation step S304, it will be possible to count the number of cells present in the living cell or set of living cells 80 observed or observe the texture and the grain of these living cells or sets of living cells thanks to the imaging system 120 and optionally also thanks to an adapted lighting.

In the specific case where the living cell or set of living cells 80 is an embryo, to be able to observe the evolution of the development as a whole the images captured by the wide-field camera 121 may be recorded while taking care to identify the embryo 80 and the date and time of image capture.

According to a second general embodiment of the observation method according to the invention, and illustrated in FIG. 14, it is possible to observe another living cell or set of living cells 80 located in another compartment 61 of the Petri dish 10. An additional step S310 can thus be performed with respect to the first embodiment of the observation method, of which a synoptic has been illustrated in FIG. 12. The Petri dish 10 and the assembly formed by at least the lighting system 110 and the narrow-field camera can be moved relative to one another with the movement means 160. The movement is performed along a parallel plane with the horizontal plane defined by the Petri dish 10 or with that defined by the support 1 whereon the Petri dish 10 is placed. The movement is performed such that the assembly formed by at least the lighting system 110 and the wide-field camera 121 is positioned at the compartment 61 of the new living cell or set of living cells 80 to be observed. FIG. 14 shows the synoptic of this embodiment of observation of another living cell or set of living cells 80 located in another compartment 61 of the Petri dish.

It should be noted that to save time when observing several living cells or sets of living cells 80, the processing unit of the imaging system 120 can store the previous positions of the living cells or sets of living cells 80 observed in memory to instruct the movement means to go directly to these positions. Thus, the time-lapse between two image captures of the same living cell or set of living cells 80 is reduced and the evolution over time of the living cell or set of living cells 80 is observed more effectively.

In the case where the imaging device 100 further comprises a liquid lens 170, the observation plane of the living cell or set of living cells 80 can be determined by a configuration of the liquid lens 170.

According to a third embodiment of the observation method according to the invention, it is possible to observe a living cell or a set of living cells 80 in the depth thereof. For this purpose, an imaging device 100 comprising a liquid lens 170 is used. The use thereof makes it possible to do away with a means for mechanical movement along the z axis defined perpendicularly to the horizontal plane defined by the support 1, and therefore reduce the configuration time of the imaging device for observing living cells or sets of living cells 80. Typically, the depth range of a living cell or set of living cells 80 studied is of the order of a few dozen micrometres (for example from 10 μm to 100 μm, typically 20 μm). An observation plane is determined by a configuration of the liquid lens 170 in a step S312. Configuration of the liquid lens 170 should be understood as the setting of a control parameter such as an electric voltage for defining the focal distance of the liquid lens 170. For example, to implement the embodiment of the observation method described above, the liquid lens model C-u-25H0-075 from the brand Varioptic can be used.

Thus, the additional step S312 of determining an observation plane by configuring the liquid lens 170 can be repeated several times to observe a living cell or set of living cells 80 in several perpendicular planes to the direction of the depth determined by different configurations of the liquid lens 170. FIG. 15 shows the synoptic of this embodiment of observation of a living cell or set of living cells 80 in the depth thereof.

The invention also relates to a computer program product downloadable from a communication network and/or recorded on a computer-readable medium and/or executable by a processor. This program comprises program code instructions for implementing the method for observing the development of a living cell or a set of living cells 80 as defined above.

To optimise the observation of the living cells or sets of living cells 80 and particularly minimise the deviation between each image captured by the wide-field camera 121, the computer program could optimise the movement of the assembly formed by at least the lighting system 110 and the wide-field camera 121 thanks to the knowledge of previously recorded positions of the living cells or sets of living cells 80.

Advantageously, the computer program may also make it possible to view the captured images of a living cell or a set of living cells 80 either in the form of a video tracking the evolution thereof over time, or image by image.

Example 1: Observation of an embryo with an imaging device according to the invention and using an observation method according to the invention with different types of lighting FIG. 16 shows two images of an embryo 80 obtained with an imaging device 100 according to the invention and according to the first embodiment of the observation method according to the invention, respectively using a "contour" type lighting and a "texture" type lighting. In the image with "contour" type lighting, the edges of the cells forming the embryo 80 as well as the edges thereof, and in the image with "texture" type lighting, the relief and the texture of these elements are respectively distinguished therein.

Example 2: Observation of an embryo in the depth thereof with an imaging device according to the invention and according to the third embodiment of the observation method according to the invention FIGS. 18a and 18b show different transverse sections of an embryo at different depths, obtained with an imaging device comprising a liquid lens model from the brand Varioptic, (C-u-25H0-07), having a focal distance of 7.5 mm for an application voltage of 40V. FIG. 17a shows a series of sections with a "contour" type lighting, where the cutting planes are spaced apart by about 30 microns by applying defined voltage ranges of the liquid lens. FIG. 17b shows a series of sections with a relief type lighting, where the cutting planes are spaced apart by 30 μm. In these series of images, the same properties as in FIG. 16, as well as the sharpness of each transverse section can be observed.

The invention as described above has multiple advantages.

The imaging device is no longer equipped with a set of lenses with different magnifications to be handled manually as on current microscopes, but it is equipped with a single camera enabling direct observation, without preliminary setting or movements of a first living cell or set of living cells 80 placed in any position in a compartment 61 of a Petri dish 10, the observation being a high-resolution observation of the living cell or set of living cells 80.

The constraints with respect to the deposition of the living cells or sets of living cells 80 which can move within their compartment 61 in the Petri dish 10 are therefore relaxed in that the wide-field camera 121 covers at least the entirety of the surface area of a compartment 61. This makes it possible not to have to move the imaging device 100 to observe the living cell(s) or sets of living cells 80 in their compartment 61.

The different types of lighting that can be comprised in the imaging device make it possible to configure the image processing operations associated with the different phases of the observation process such as identifying the Petri dish 10 and therefore the living cells or sets of living cells 80, the detection thereof by the imaging system 120, or counting the number of cells present in the living cell or set of living cells 80 observed.

The imaging device 100 and the method for observing living cells or sets of living cells described here make it possible to enhance the optical quality of the image, as well as the material efficiency, i.e. the use of simplified equipment with respect to the devices known in the prior art, and temporal efficiency, thanks to the limitation of the movement means and the removal of movements in depth, of reproduction study processes, particularly in respect of In Vitro Fertilisation, while reducing the costs of manufacture and use of the device.

The invention claimed is:

1. Imaging device for observing a development of living cells or sets of living cells in context of reproduction study, comprising:
    an imaging system comprising a wide-field camera adapted for observing of one or more living cells or the sets of the living cells to be observed, the one or more living cells or the sets of the living cells being deposited in a Petri dish containing a compartment for each living cell or set of living cells;
    a support capable of receiving the Petri dish and positioned between a lighting system and the imaging system;
    the lighting system comprising three light sources, adapted to emit light rays to illuminate an object which is the one or more living cells or the sets of the living cells to be observed, including a central source, a first lateral source placed on a first side of the central source, and a second lateral source placed on a second side of the central source,
    the lighting system comprising an optical shaping system and being configured to implement each of the following specific types of lighting:
    a "detection" type lighting for detecting the one or more living cells or the sets of the living cells to be observed by the imaging system, the "detection" type lighting being produced using the central source, the first lateral source and the second lateral source, light rays from the light sources being focused by the optical shaping system on the object according to a cone ($\alpha\_GC$) having an angular aperture between 26° and 34°;
    a "contour" type lighting for counting a number of living cell(s) present in the one or more living cells or the set of the living cells observed by the imaging system, the "contour" type lighting being produced using the first lateral source and the second lateral source, the light rays from the first lateral source and the second lateral source being separated by the optical shaping system into two symmetrical collimated beams with respect to an axis (P) perpendicular to a plane formed by a Petri dish support or the Petri dish per se, a first beam from the first lateral source illuminating the object according to an angle of incidence with respect to the perpendicular axis (P) between 10° and 14°, a second beam from the second lateral source illuminating the object according to an angle of incidence with respect to the perpendicular axis (P) between 10° and 14°;
    a "relief" type lighting for viewing a texture and granularity of the one or more living cells or the sets of the living cells present in the one or more living cells or the set of the living cells observed by the imaging system, the "relief" type lighting being produced using the first lateral source and the optical shaping system so that a single collimated light beam propagates along an axis inclined by an angle with respect to the perpendicular axis (P) between 8° and 16°;
    movement means for relative movement of the Petri dish with respect to an assembly formed by the lighting system and the wide-field camera so as to be able to observe the one or more living cells or the sets of the living cells located in the compartments of the Petri dish,
    the wide-field camera having a field of view covering at least a total surface area of one of the compartments of the Petri dish, and the imaging device being adapted to image, without relative movement of the Petri dish with a movement means with respect to the assembly formed by the lighting system and the wide-field camera, one living cell or the set of the living cells in any position in the compartment associated thereto in the Petri dish and the wide-field camera having a resolution adapted for observing the living cell or the set of the living cells at a micrometric level of detail.

2. Imaging device according to claim 1 wherein the living cells or the sets of the living cells are one or more embryos.

3. Imaging device according to claim 1, wherein a light source of the lighting system is disposed in a parallel plane with a horizontal plane defined by the support capable of receiving the Petri dish, and the optical shaping system is disposed between the light source and the Petri dish.

4. Imaging device according to claim 1, wherein the movement means are capable of moving the assembly formed by the lighting system and the wide-field camera of the imaging system, relative to the Petri dish wherein the living cells or the sets of the living cells to be observed are deposited, in a plane parallel to a plane defined by the support of the Petri dish.

5. Imaging device according to claim 1 further comprising a liquid lens, adapted to control a focal distance of the living cell or the set of the living cells in a direction of a depth thereof.

6. Method for observing a development of living cells or sets of living cells by an imaging device as defined in claim 1, comprising the following steps:
    a preparation step of successively depositing a living cell or a set of living cells into a Petri dish and which can be chosen from at least one Petri dish disposed on a support of the imaging device, the Petri dish having an identification element, followed by a drop of a culture medium in the Petri dish, the preparation step being repeated as many times as needed according to a number of living cells or sets of living cells to be observed;
    then covering all deposited living cells or sets of cells with a liquid;
    an identification step of the Petri dish of detecting and viewing, using a dedicated reader, the identification element of the Petri dish containing the living cell(s) or sets of living cells to be observed; and
    an observation step of a first living cell or set of living cells using the imaging system.

7. Method for observing the development of living cells or the sets of the living cells according to claim 6 further comprising, prior to the identification step, an approximate positioning step of a chosen Petri dish with respect to the assembly formed by the lighting system and the wide-field camera of the imaging system relative to the chosen Petri dish using the movement means, such that the Petri dish is roughly aligned with the assembly formed by the lighting system and the wide-field camera of the imaging system.

8. Method for observing the development of living cells or the sets of the living cells according to claim 6, after the step of observing a first living cell or a first set of living cells, a relative movement step of the Petri dish with respect to the assembly formed by the lighting system and the wide-field camera of the imaging system for observing another living cell or another set of living cells located in another compartment of the Petri dish.

9. Method for observing the development of the living cells or the sets of the living cells according to claim 6, in a case wherein the imaging device further comprises a liquid lens, wherein the step of observing a first living cell or a first set of living cells is performed in a horizontal observation plane parallel with the support capable of receiving the Petri dish and perpendicular to a direction of a depth of the first living cell or of the set of the living cells, the plane being determined in an additional determination step by a configuration of the liquid lens.

10. Method for observing the development of the living cells or the sets of the living cells according to claim 9, wherein the step of determining an observation plane of the first living cell or of the set of the living cells is repeated for different planes perpendicular to the direction of the depth of the first living cell or of the set of the living cells by different configurations of the liquid lens, so as to observe a first living cell or a first set of living cells in different observation planes determined.

11. Method for observing the development of the living cells or the sets of the living cells according to claim 6, wherein the liquid is oil or water.

12. Imaging device according to claim 1, for observing the development of the living cells or the sets of the living cells in the context of reproduction study for In Vitro Fertilisation (IVF).

\* \* \* \* \*